Figure 1:
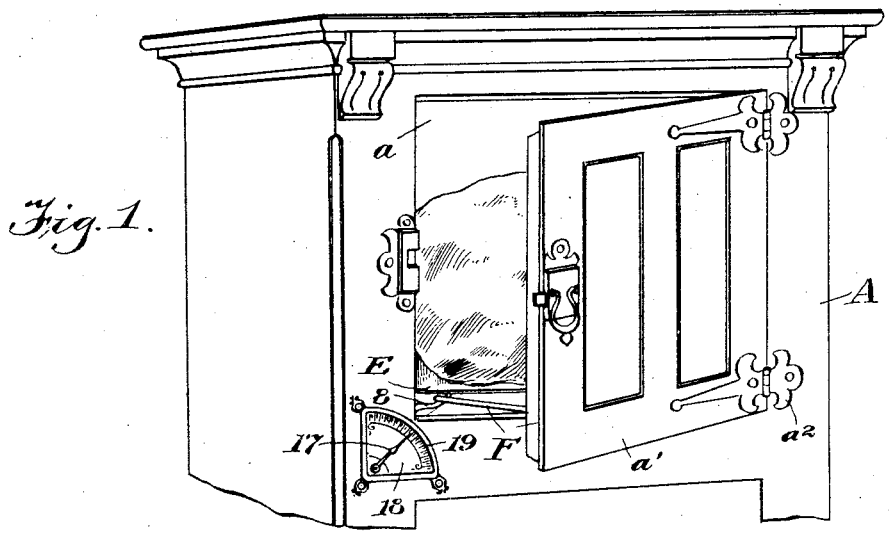

No. 790,529. PATENTED MAY 23, 1905.
J. B. SALO & A. H. HOAG.
WEIGHING MECHANISM.
APPLICATION FILED JULY 9, 1904.

4 SHEETS—SHEET 1.

WITNESSES:
Robert Head
V. E. Nichols

INVENTORS:
John B. Salo
Andrew H. Hoag,
BY
Griffin Bernhard & Cavanagh
ATTORNEYS

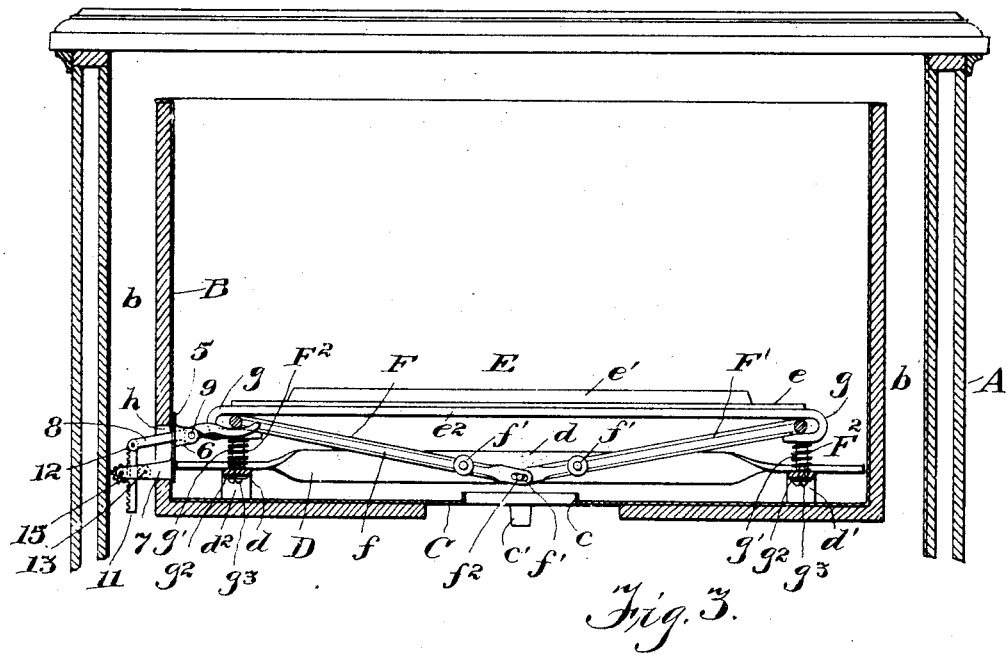

No. 790,529. PATENTED MAY 23, 1905.
J. B. SALO & A. H. HOAG.
WEIGHING MECHANISM.
APPLICATION FILED JULY 9, 1904.

4 SHEETS—SHEET 3.

WITNESSES:
Robert Head
V. E. Nichols

INVENTORS:
John B. Salo,
Andrew H. Hoag,
BY
Griffin Bernhard & Cavanagh.
ATTORNEYS No. 790,529. PATENTED MAY 23, 1905.
J. B. SALO & A. H. HOAG.
WEIGHING MECHANISM.
APPLICATION FILED JULY 9, 1904.

4 SHEETS—SHEET 4.

WITNESSES:
Robert Head
V. E. Nichols.

INVENTORS:
John B. Salo
Andrew H. Hoag,
BY
Griffin Bernhard Cavanagh
ATTORNEYS.

No. 790,529.                                                          Patented May 23, 1905.

UNITED STATES PATENT OFFICE.

JOHN B. SALO AND ANDREW H. HOAG, OF NEW YORK, N. Y.

WEIGHING MECHANISM.

SPECIFICATION forming part of Letters Patent No. 790,529, dated May 23, 1905.

Application filed July 9, 1904. Serial No. 215,921.

*To all whom it may concern:*

Be it known that we, JOHN B. SALO and ANDREW H. HOAG, citizens of the United States, and residents of the city of New York, borough of Manhattan, county of New York, and State of New York, have invented certain new and useful Improvements in Weighing Mechanisms; and we do hereby declare the following to be a full, clear, and exact description of the same.

Our invention is a weighing mechanism or scale, the same being especially designed for use in connection with a refrigerator, ice-chest, or ice-box, although certain features of the invention may be used in the construction of platform-scales.

The leading thought involved in the present improvement is a simplification of the construction with a view to securing a compact and efficient scale which will weigh the load and indicate the weight accurately.

In the use of the scale as a part of the refrigerator we seek to provide a compact construction which may be removed at will from an ice-chamber for the purpose of cleaning the latter and without dismantling the scale proper.

Another object of the invention is to provide for the ready installation of the scale into any style or class of refrigerator without change or modification in the structure thereof. Furthermore, we aim to provide such a construction that the apparatus may be used to excellent advantage on that style of refrigerators having the ice-door in the upper front part thereof, the improved scale mechanism being so installed that the indicator lies wholly out of the path of the ice-door and the load-platform lies so low down that ice and food substances can be introduced and removed at will.

A further object of the invention is to provide a form of indicator mechanism which may be applied to an existing type of refrigerator without cutting a hole or slot in the ice-chest or the refrigerator except by boring a small hole therein for the reception of the indicator-stem.

A further object of the invention is to provide a novel form of indicator mechanism wherein an adjustable member is employed for the purpose of compensating for any slight inaccuracies in the position of the indicator with respect to the load-platform or of said platform to the indicator or of one of said parts relatively to the other, thereby insuring accuracy of weight indication.

The broad feature of our invention resides in a refrigerator or the like wherein the load-platform and its counterpoise are removable at will from an ice-chamber, while the indicator devices may remain installed as a permanent fixture in the structure.

Our invention furthermore consists of an indicator-operating device arranged to be supported within the refrigerator and including a member which is adapted to play in one of the usual circulating openings or passages between the ice-chamber and a storage-chamber of said refrigerator, said member having coöperative relation to the load-platform of the scale and being adapted to transmit the motion thereof to the operating devices for the visual index-hand.

Further objects and advantages of the invention will appear in the course of the subjoined description, and the actual scope of the invention will be defined by the annexed claims.

Reference is to be had to the accompanying drawings, forming a part of this specification, in which like characters of reference are used to indicate corresponding parts in all the figures.

Figure 2:
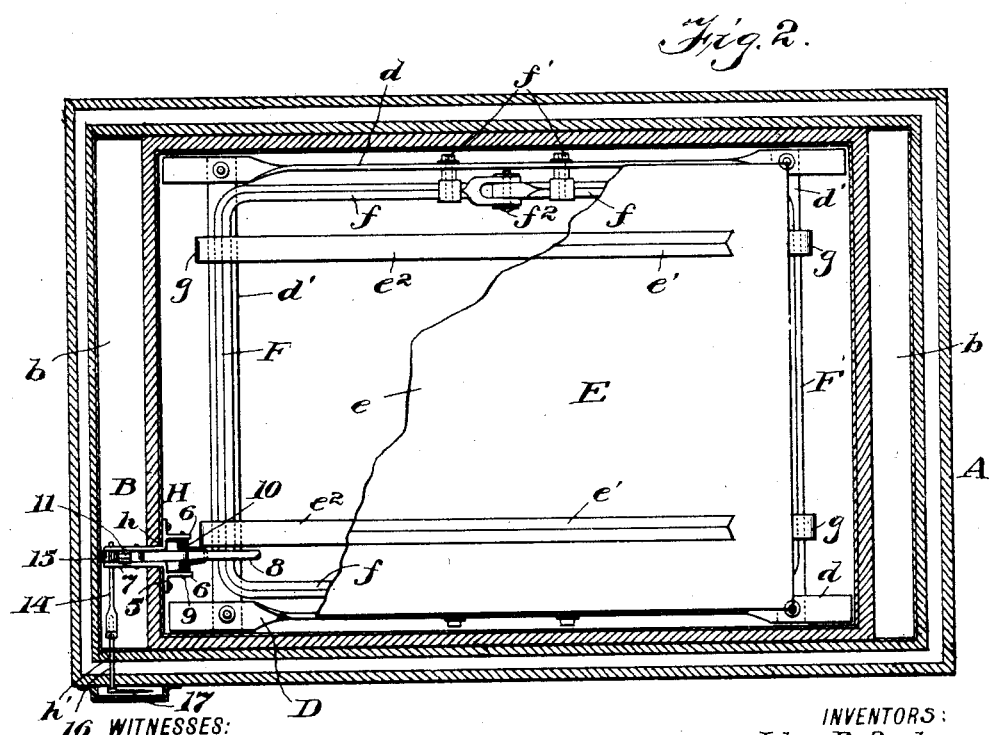
Figure 5:
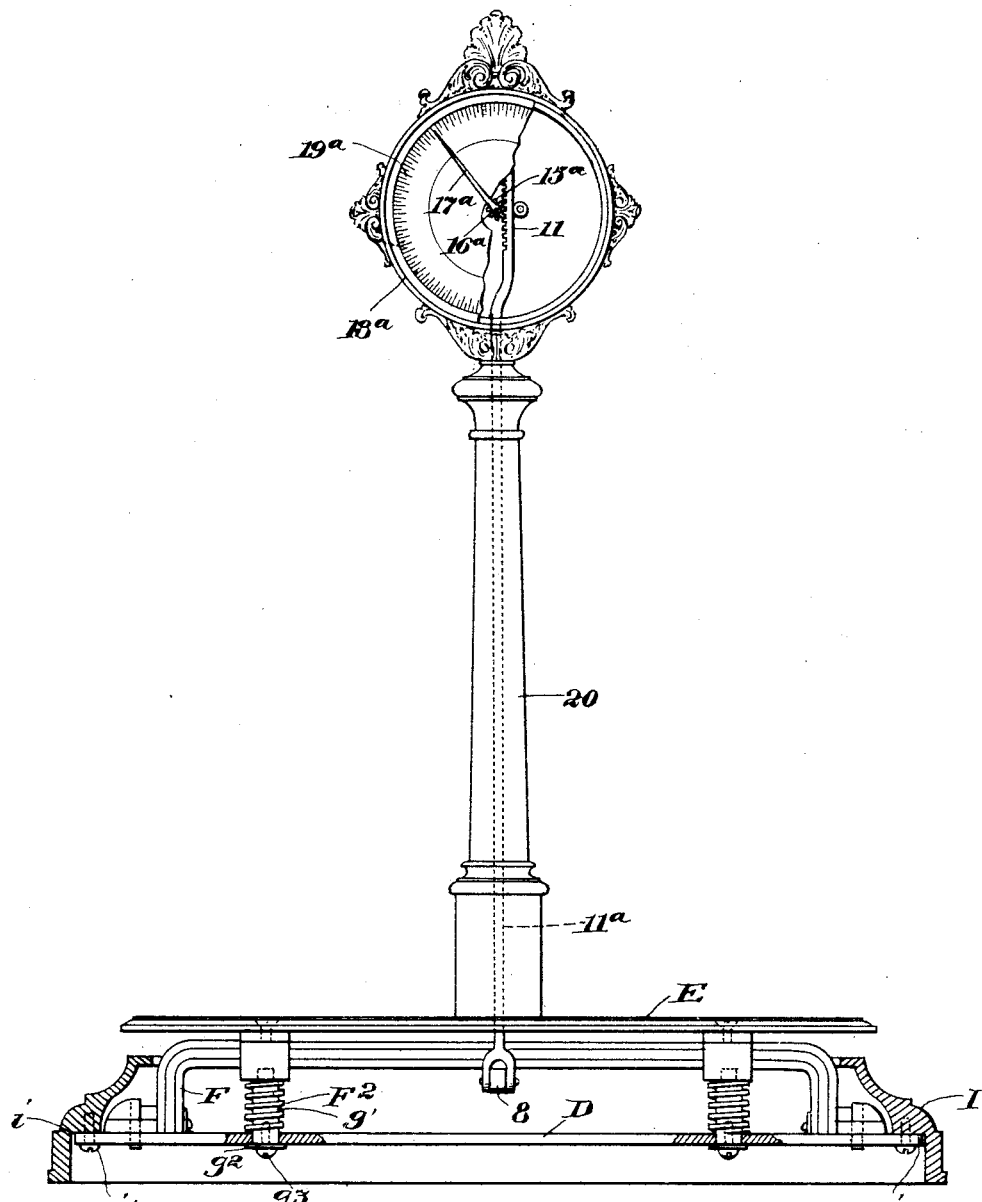
Figure 6:
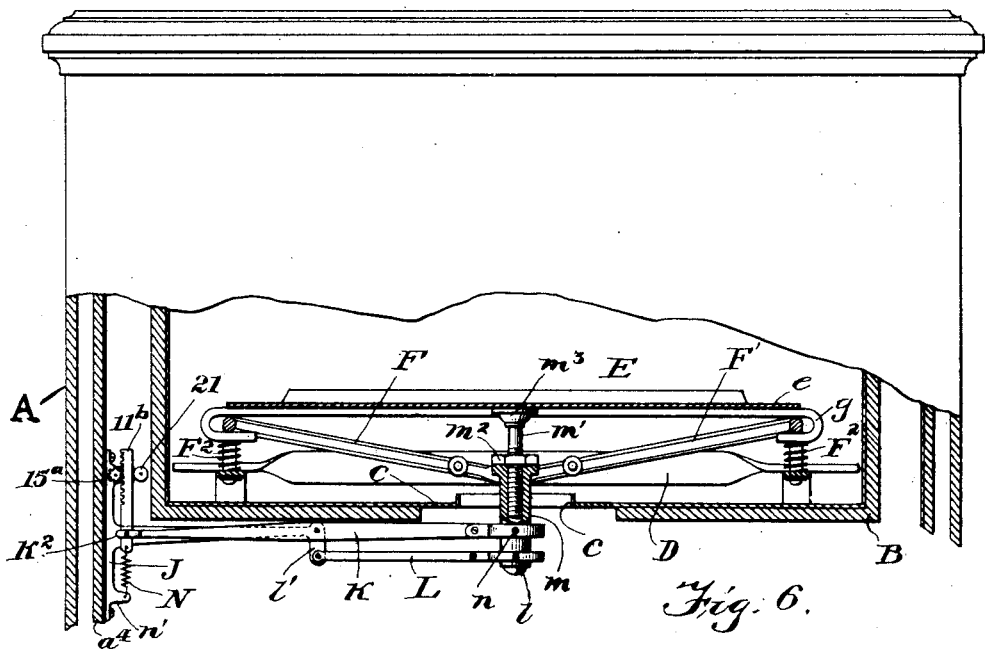
Figure 7:
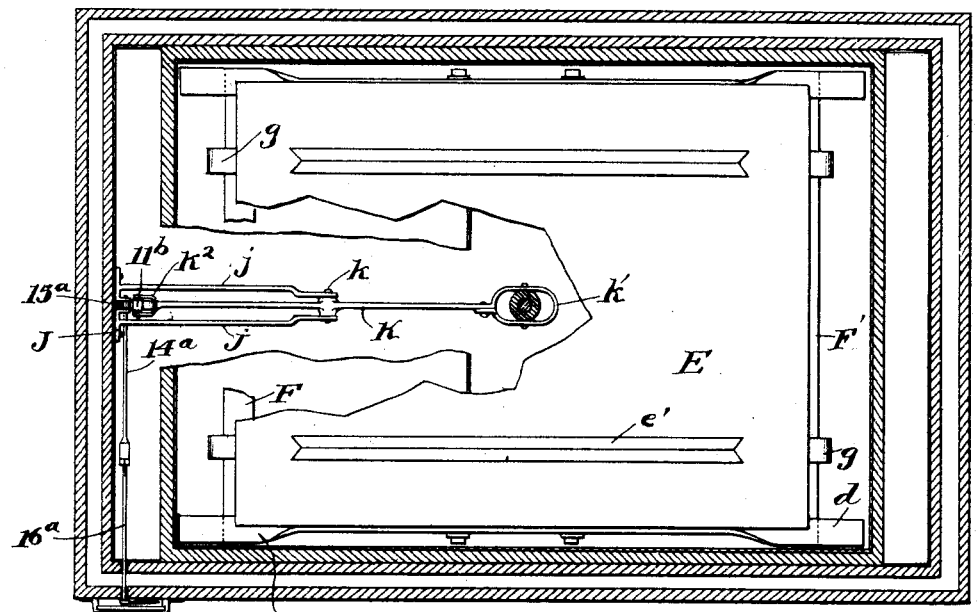

Figure 1 is a perspective view of a portion of one style of refrigerator wherein is installed our improved weighing-scale. Fig. 2 is a horizontal section through the upper part of the refrigerator on a plane above the load-platform, certain parts of the improved weighing mechanism being broken away and shown in section and in plan. Fig. 3 is a vertical sectional view taken longitudinally through a part of the refrigerator and the weighing mechanism, a portion of said weighing mechanism being shown in elevation. Fig. 4 is a vertical transverse section through the refrigerator, illustrating the weighing mechanism in end elevation. Fig. 5 is an elevation, partly in section, of our invention embodied as a platform-scale. Fig. 6 is a vertical sectional elevation illustrating another form of indicator mechanism which is supported independently of the ice-chest. Fig. 7 is a horizontal sectional plan view, certain parts being broken away to show the application of the indicator mechanism, which is represented partly by Fig. 6.

In the embodiment of our invention shown by Figs. 1 to 4, inclusive, of the drawings we have shown the scales applied to an ordinary form of refrigerator A, having a door-opening $a$ in the upper front part thereof, said opening being in communication with the chamber of an ice-chest B. Said opening $a$ is adapted to be closed by a horizontally-swinging door $a'$, arranged to turn on hinges $a^2$, the axes of which are vertical. The ice-chest B is provided at its bottom with a drip pan or tray C, the same having a flanged circulation-opening $c$ and being in communication with a drain-pipe $c'$. The ice-chest B is situated within the upper part of the refrigerator A to leave the openings or spaces $b$ at the end portions of said refrigerator. The detailed construction of the refrigerator and the ice-chest therein is not a material part of our invention, and these elements are illustrated and described herein in order that others may understand the invention, its functions, and advantages when it is applied to a refrigerator of the class described. It is to be understood, however, that we do not restrict ourselves to the use of our scales in connection with a refrigerator of this particular class nor to the use of the scales in connection with any particular style of refrigerator, because we are aware that the improved scales may be used on any and all classes of refrigerators, ice-chests, and ice-boxes and that the invention may also be embodied in a platform-scale, as will hereinafter appear.

In the present invention we have provided an improved construction of scales wherein the load-platform and its counterpoise may be removed at will from the ice-chest for the purpose of cleaning the latter without let or hindrance from the weighing mechanism. To accomplish this end, we employ a suitable foundation or base, (indicated in its entirety at D,) and on this base we mount the load-platform E and its counterpoise. Any kind of form or frame may be employed as the base or foundation D, but, as shown by the drawings, it consists of longitudinal rails $d$ and transverse bars $d'$, said rails and bars being united solidly one to the other and said bars being bent at their ends to form feet $d^2$. The frame constituting the base or foundation D is skeletonized to insure the free circulation of air and of the drip-water which results from melting of the ice, and the feet $d^2$ are adapted to rest on the drip pan or tray, so as to elevate the foundation or base for a suitable distance and also to maintain said base and the load-platform in a horizontal position. The load-platform is shown as consisting of a plate or sheet $e$, of metal or any other suitable material, and it is provided on its upper side with ice plates or rests $e'$, while to its under side is fastened the longitudinal bars $e^2$.

The counterpoise for the load-platform consists of bails F F' and springs $F^2$ or their equivalents. Each bail of the counterpoise consists of cross-bars and two side arms, the latter being indicated at $f$. The side arms of the two bails are fulcrumed on the longitudinal rails $d$ of the foundation or base in a suitable way—as, for example, by the bolts $f'$—and the adjacent ends of these bails are connected operatively one to the other in order to insure simultaneous and equal movement of the bails for the purpose of maintaining the load-platform in a horizontal position at all times, thereby overcoming any tendency of the platform to tilt more at one end than at the other in case the load is unevenly distributed on said platform. As shown, the arms of the bail F are provided with the longitudinal slots $f'$, in which are arranged to play studs or bolts $f^2$, attached to the other bail, F', thus producing the desired operative connection between the coöperating bails for sustaining the load-platform; but it is evident that in lieu of this pin and slotted connection we may employ the geared connection between the pivoted bails, as disclosed in our prior applications for Letters Patent, filed January 18, 1904, and March 15, 1904, the same being serially numbered 189,481 and 201,327, respectively.

The bars $e^2$, attached to the under side of the load-platform, are bent at their ends to produce the loops $g$, the latter being fitted around the cross-bars of the bails F F', so as to connect the platform at its end to the bails. Said cross-bars of the bails have attached thereto depending guide-stems $g'$, which pass loosely through suitable openings in the cross-bars $d'$ of the foundation or base. I prefer to fasten the stems $g'$ rigidly to the bails F F' and to arrange the stems in the openings of the base so as to have a certain amount of loose play therein, the play being just sufficient for the bails to swing on their centers. Around said stems are fitted coiled springs $F^2$, the latter being seated on the base or foundation and acting against the bails so as to sustain said bails and the load-platform normally in raised positions. When the platform is depressed, as by imposing a load thereon, the balls are forced downwardly and the springs $F^2$ are compressed, the stems $g'$ sliding in openings on the base or foundation D; but the upward movement of the platform, the bails, and the springs are arrested by washers $g^2$, which are fastened to the lower ends of the stems by screws $g^3$, said washers being effective in arresting the upward movement of the platform under the action of the counterpoise-springs.

From the foregoing description, taken in connection with the drawings, it will be seen that the load-platform and its counterpoise are mounted wholly on the foundation or base, so as to be carried or supported thereby. The base and the platform are so proportioned and constructed that they may be readily placed in or installed within the ice-chest B, the feet $d^2$ of the base being adapted to rest upon the ice tank or tray C. The entire device comprising the base, the platform, and counterpoise therefor may be easily and quickly elevated out of the ice-chest and withdrawn through the door-opening $a$ of the refrigerator, thus relieving the ice-chest from the incumbrance of the weighing mechanism and permitting an operator to easily and thoroughly clean the interior of said refrigerator or the ice-chest thereof. Furthermore, the load-platform and its counterpoise are exceedingly compact in construction, so as to take up a very small amount of room in the lower part of the ice-chest B, and the employment of bails F F' enables us to amplify the action of the counterpoise when movement is given to the load-platform by imposing weight thereon, whereby said platform is adapted to occupy a position close down in the ice-chest, and thus permit the ice or food substance to be easily introduced into or removed from the ice-chest through the door-opening $a$ in the upper front part of the refrigerator.

In connection with the platform and counterpoise of the scale, as heretofore described, we employ an indicator mechanism, which is adapted to be actuated by the vertical travel of the platform and which in the present embodiment of the invention shall remain permanently installed in the refrigerator when the platform and its associated parts are withdrawn for the purpose of cleaning the ice-chest. The type of indicator which we prefer to employ is of compact construction, in order that it may be located in one corner of the refrigerator or the ice-chest and entirely out of the path of the swinging door $a'$, said indicator mechanism having a pointer which is always exposed to view from the outside of the refrigerator. The indicator mechanism is designated in its entirety at H, and to install said indicator mechanism it is necessary to provide openings $h$ in the ice-chest B and in the front of the refrigerator A, the latter opening $h'$ being provided at a point below the lower left-hand corner of the door $a'$. On the inside of the ice-chest B is secured a plate 5, which is provided with a forwardly-extending bracket 6 and with a rearwardly-extending bracket 7, the former bracket 6 being arranged to project into the ice-chest B, while the last-named bracket 7 extends into the space $b$ between the ice-chest and the refrigerator. (See Figs. 2 and 3.) In the bracket 6 is fulcrumed a lever 8 by means of a pin or bolt 9, one arm of said lever being curved and fitting below the cross-bar of the bail F. Against this arm of said lever acts a tension-spring 10, which normally presses the arm in an upward direction and holds it into engagement with the bail, said spring 10 being held in place by coiling it around the fulcrum pin or bolt 9 of the lever. The other arm of the lever 8 extends rearwardly through a hole in the plate 5 and through the opening $h$ in the chest B, and to its arm is pivoted a vertically-disposed rack-bar 11, said lever-arm and the rack-bar being united by a pin 12. The rack-bar plays in the space between the bracket 7 of the plate 5, and it is guided by a sleeve or roller 13, the latter being mounted in said bracket 7 in position for engagement with the smooth edge of the rack-bar. A horizontal shaft 14 is journaled in the plates or lugs forming the bracket 7, and on this shaft is secured a small gear 15, the latter being arranged in intermeshing engagement with the rack-bar 11. The shaft 14 lies in the space $b$ of the refrigerator, at one corner thereof, and it is adapted to be rotated by the gear 15 and the rack 11 when the lever 8 is turned by vertical travel of the load-platform E. The shaft 14 has an indicator-pin 16 secured thereto in any suitable way, said pin passing through the opening $h'$ of the refrigerator. The outer end of this indicator-pin is provided with a pointer 17, which is normally exposed to view through a transparent front of a casing 18, and this pointer 17 traverses the dial 19 when the shaft 14 and the pin 16 are rotated by the action of the transmitting mechanism, which is comprised in and by the lever, the rack, and the gear. The casing 18, containing the dial 19 and the index-hand 17, are arranged in an exposed position on the outside of the refrigerator out of the path of the door, and the visual members of the indicator mechanism are thus always exposed to enable the housekeeper to readily ascertain the weight of the load on the scale-platform E.

The indicator mechanism H is adapted to be easily and quickly applied to any kind of refrigerator or ice-chest or ice-box, and to install this mechanism it is only necessary to cut the opening $h\ h'$, after which the plate 5 is secured in position and the several parts are assembled, so that the pin 16 may pass through the opening $h'$, while one arm of the lever 8 will extend into the chamber of the ice-chest B. The base which carries the platform and the counterpoise may readily be introduced into the ice-chest for the cross-bar of the bail F to engage with one arm of said lever 8, and the parts are now in position for the scale to weigh the ice or any other substance that may be placed in the ice-chest of the refrigerator. It is evident that a cake of ice may easily be thrust through the opening $a$ and placed on the platform E, thereby depressing the latter and moving the bails F F' so as to compress the counterpoise-springs F². The downward movement of the platform and the bails act on the lever 8 to raise the rack-bar 11, which in turn rotates the gear 15 and the shaft 14 16, whereby the index-hand 17 is made to traverse the dial 19 and indicate the weight of the ice deposited on the platform. The spring 10 keeps one arm of the lever normally in engagement with one bail of the counterpoise and a decrease of the weight on the platforms allows the springs F² to raise the platform, while the spring 10 makes the lever 8 follow the upward movement of the bail F, whereupon the index-hand 17 will be turned backwardly and correctly indicate the weight of the load on the platform, whereby the housekeeper can ascertain at any time the quantity, by weight, of ice contained in the chest B. It is evident that the base, with the load-platform and the counterpoise, can be readily lifted out of the ice-chest and free from engagement with one arm of the lever 8; but when these parts are replaced said arm of the lever will reengage with a cross-bar of the bail F, so as to restore the scale mechanism to an operative condition after the refrigerator shall have been cleaned.

In Fig. 5 of the drawings we have shown our improvements embodied as a platform-scale adapted for weighing merchandise generally. The foundation or base D is housed or contained within a suitable surrounding frame A, the same being provided with an internal ledge or shoulder $i$, against which is fitted certain members of the base C, thus permitting the base to be secured firmly to the surrounding frame by screws or bolts, such as $i'$. On this base D are fulcrumed the bails, one of which is indicated at F, and against said bails act the coiled springs F², which are held in place by the guide-stems $g'$, the latter passing loosely through openings in the base D and limited in their upward movement by the washers $g^2$ and the screws $g^3$. The load-platform E is connected operatively with the cross-bars of the bails, and the vertical movement of this platform is communicated by a lever 8, to one arm of which is attached a vertical stem 11$^a$, the upper end of which is formed into a rack 11. Said stem passes through and is housed in a column or post 20, which carries a suitable housing 18$^a$, containing a scale 19$^a$. The rack 11 is arranged to actuate a shaft 16$^a$, which is equipped with a gear 15$^a$, the latter meshing with the rack 11 and the shaft being provided with a pointer 17$^a$. The operation of this part of our invention will be readily understood from the foregoing description, taken in connection with the drawings.

In Figs. 6 and 7 of the drawings we have shown a preferred form of indicator mechanism which is adapted to be fastened to the inside of the refrigerator without mutilation of the ice-chest or of any part of the refrigerator. This indicator mechanism contemplates the use of a bracket J, the same having forwardly-extending arms $j$, between which is arranged a horizontal lever K. The bracket J is fastened to the inside of the refrigerator A or its lining $a^4$ by any suitable means and at any suitable point; but preferably the bracket is secured to the lining $a^4$ for the arms $j$ to extend horizontally below the ice-chest B, thus avoiding the necessity for cutting a slot or opening in the ice-chest to provide for the proper operation of the indicator mechanism. The lever K occupies a substantially horizontal position below the bottom of the ice-chest, and it extends from the circulation-opening $c$ in said chest-bottom nearly to the lining $a^4$, as shown. Said lever is fulcrumed at a point intermediate at its length, as at $k$, to the bracket-arms $j$, and at the inner end of said lever it is bent or otherwise provided with a loop $k'$, the outer end of the lever being forked, as at $k^2$. The loop-shaped end $k'$ of the lever K is adapted to carry an extensible member that is adapted for engagement with a load-platform E. As shown more clearly by Fig. 6, this extensible member consists of a stem, which is made in two sections, one of which, $m$, is a sleeve or tube, while the other is a solid pin or rod $m'$. The sleeve $m$ is threaded interiorly for a part of its length, and the rod $m'$ has a male thread which adapts it to be secured into said tube, the parts being held in their adjusted positions by a nut $m^2$, which is secured on the rod $m'$ and is adapted to bind against one end of the tube $m$. The tubular member of this extensible stem is pivoted at $n$ in the bail-shaped end $k'$ of the lever K, and this extensible member is maintained in an upright position by a rod L, one end of which is pivoted at $l$ to the tube $m$, while the other end of said rod is linked at $l'$ to an arm $j$ of the bracket J, whereby the rod L is kept parallel with the lever K and coöperates therewith in holding the extensible stem in an upright position for engagement with the load-platform. The solid section $m'$ of the extensible stem has a head $m^3$, which enables it to have proper bearing against the under side of a load-platform; but it will be understood that this extensible stem is not attached to said platform, whereby the platform and its counterpoise may be removed at will from the ice-chest without disturbing the position of the indicator devices within the refrigerator. The employment of an extensible stem compensates for any inaccuracies in the application or adjustment of the bracket J to the refrigerator, and in applying the indicator mechanism to the refrigerator the workman is not compelled to accurately fasten said bracket in place below the ice-chest. A vertically-disposed rack 11$^b$ is pivoted in the bifurcated end $k^2$ on the horizontal lever K, and to the lower end of this rack is attached a spring N, the lower end of which is anchored by a lug $n'$ of the bracket, said spring being effective in pulling down the outer end of the lever K, so as to raise the inner end of said lever, thus maintaining the extensible stem in coöperative engagement with the load-platform. The rack $11^b$ is guided within the bracket J and is adapted for engagement with a friction-roller 21. With said rack meshes a pinion $15^a$, which is secured to a horizontal shaft $14^a$, and to this shaft is fastened the indicator-stem $16^a$, the latter being adapted to pass through a suitable opening in the front wall of the refrigerator. The stem $16^a$ carries a suitable index adapted to traverse a dial on the outside of the refrigerator in the manner heretofore described.

Changes in the form, size, and proportion or parts and in the details of construction may be made without departing from the spirit or sacrificing any of the advantages of our invention. We therefore reserve the right to make such modifications and alterations as fairly fall within the scope of our invention.

Having thus described our invention, what we claim, and desire to secure by Letters Patent, is—

1. A refrigerator, or the like, provided with a weighing mechanism comprising a platform, a counterpoise therefor, and an indicator having operative separable relation to the platform; said platform and the counterpoise being removable in a connected operative condition from the refrigerator independently of the indicator.

2. A cleanable refrigerator or the like, having a scale including a platform, a counterpoise therefor, and an indicator, the latter having detachable engagement with the platform; said platform and the counterpoise being removable in a connected condition from the refrigerator and without disturbing the indicator.

3. A refrigerator, or the like, provided with a weighing mechanism comprising a platform, equalizer devices therefor, a counterpoise, and an indicator having separable engagement with the platform; said platform together with the equalizer and the counterpoise being removable in a connected condition independently of the indicator.

4. A cleanable refrigerator, or the like, having a scale including a suitable base, a platform, and a counterpoise, the latter being mounted on the base, and the whole being removable at will in a connected condition from the refrigerator, and an indicator installed permanently in the refrigerator and provided with a platform-actuated member, which remains undisturbed on the removal of the base, the platform and the counterpoise.

5. A refrigerator, or the like, provided with a weighing mechanism comprising a base, a platform, a counterpoise connecting the platform and the base, and an indicator having separable engagement with said platform; said base together with the platform and the counterpoise being normally connected so as to be removable and insertible independently of the indicator.

6. The combination with a refrigerator, and an indicator forming a permanent fixture therein, of a base, counterpoise-levers mounted thereon, a platform supported by the levers, and means opposing the descent of the platform; said base together with the platform, the levers and the opposing devices being removable in a connected condition independently of the indicator.

7. A cleanable refrigerator, or the like, having a scale including a suitable base, counterpoise-bails fulcrumed on the base and operatively connected one to the other, a platform carried by the bails means for moving the bails normally in one direction, and an indicator adapted to be operated by the travel of the platform; said base and platform with the bails and the actuating means for the latter being removable at will and in a normally connected condition from the refrigerator.

8. A cleanable refrigerator, or the like, having a base, counterpoise-bails pivoted thereto, stems slidable in the base and connected with the bails, springs acting against the bails, a platform carried by the bails, and an indicator adapted to be actuated by the travel of the platform.

9. A weighing-scale comprising a base, counterpoise-levers fulcrumed thereon, a platform supported by said levers on the base, and a counterpoise connected with the base and opposing the movement of the platform, in combination with an indicator supported independently of the base, and separate devices having detachable engagement with the platform and normally coöperating with the indicator for actuating the latter.

10. A scale having a base, counterpoise-bails pivoted thereto and operatively connected one to the other, stems attached to the bails and guided in the base, springs on the stems for pressing the bails upwardly, and an indicator arranged to be actuated by the travel of the platform.

11. A refrigerator, or the like, provided with an ice-chest and with a weighing mechanism, the latter comprising a counterpoised platform removable at will from said ice-chest, a permanently-installed indicator, a lever supported below the ice-chest and having operative engagement normally with said indicator, and a platform-actuated member carried by the lever; said member being adjustable to compensate for irregularities in the positions of the platform relative to the indicator-operating devices.

12. The combination of a load-platform, a visual rotating index, and operating devices between the platform and the index, said devices including a lever and an extensible member carried by said lever, said member being adjustable relatively to the load-platform to compensate for irregularities in the position of the parts one to the other.

13. The combination of a load-platform, a visual index, a lever, means actuated by the lever for operating the index, and an extensible member carried by the lever and arranged for the load-platform to rest thereon.

14. In a refrigerator-scale, the combination of a counterpoised platform arranged removably in an ice-chest, a visual indicator, and indicator-operating devices supported outside of the ice-chest and including an adjustable member having removable engagement with the platform.

15. In a refrigerator, the combination of a counterpoised scale-platform removably fitted in an ice-chamber, an indicator, a lever supported outside of the ice-chamber and coöperating with the indicator, and an adjustable member carried by said lever and coöperating with the platform.

16. In a refrigerator, the combination with a load-platform, and an indicator, of a lever, means between the lever and the indicator for operating the latter, a pivoted stem carried by the lever and engaging with said platform, and means for holding the stem in an operative position.

17. The combination of a load-platform, a counterpoise therefor, an equalizer for the platform, a lever independent of the equalizer and the counterpoise, an indicator controllable by the lever, and a platform-actuated member carried by the lever, said member being adjustable relative to the platform.

18. The combination of a load-platform, a counterpoise therefor, an equalizer for the platform, a lever independent of the equalizer and the counterpoise, an indicator controllable by the lever, and a two-part extensible member carried by the lever and normally supported thereby in coöperative relation to the platform.

19. The combination of a load-platform, a counterpoise therefor, an equalizer for the platform, a lever independent of the equalizer and the counterpoise, an indicator controllable by the lever, and a member between one arm of said lever and the platform, said member being adjustable relative to the lever.

20. The combination of a load-platform, equalizer and counterpoise devices therefor, a lever supported independently of the equalizer devices, an upright member adjustable relatively to the lever and disposed in the path of the platform, a rack pivoted to the lever, and an index-shaft geared to the rack.

21. The combination of a counterpoised platform, a double-armed lever supported independently of the counterpoise for said platform, an upright member connected adjustably to one arm of the lever for actuation by the platform, and an index mechanism coöperating with the other arm of the lever.

22. The combination with a counterpoised platform, of an independently-supported plate or bracket, a double-armed lever fulcrumed on the plate or bracket, an adjustable member carried by one arm of the lever for actuation by the platform, and an index mechanism controllable by the other arm of the lever.

23. The combination with a counterpoised platform, of a double-armed lever supported independently of the counterpoise for the platform, means connected with one arm of the lever and adjustable relatively thereto for making said lever follow the platform, an index, and means actuated by the other arm of the lever for operating the index.

In testimony whereof we have signed our names to this specification in the presence of two subscribing witnesses.

JOHN B. SALO.
ANDREW H. HOAG.

Witnesses:
H. I. BERNHARD,
V. E. NICHOLS.